United States Patent
Skogen et al.

(10) Patent No.: US 9,599,781 B1
(45) Date of Patent: Mar. 21, 2017

(54) PLASMON-ASSISTED OPTICAL VIAS FOR PHOTONIC ASICS

(71) Applicant: Sandia Corporation, Albuquerque, NM (US)

(72) Inventors: Erik J. Skogen, Albuquerque, NM (US); Gregory A. Vawter, Corrales, NM (US); Anna Tauke-Pedretti, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 14/847,806

(22) Filed: Sep. 8, 2015

Related U.S. Application Data

(60) Provisional application No. 62/049,033, filed on Sep. 11, 2014.

(51) Int. Cl.
| | | |
|---|---|---|
| *G02B 6/26* | (2006.01) | |
| *G02B 6/42* | (2006.01) | |
| *G02B 6/14* | (2006.01) | |
| *G02B 5/00* | (2006.01) | |
| *G02B 6/122* | (2006.01) | |

(52) U.S. Cl.
CPC ............ *G02B 6/4206* (2013.01); *G02B 5/008* (2013.01); *G02B 6/1226* (2013.01); *G02B 6/14* (2013.01); *G02B 6/264* (2013.01); *G02B 6/4218* (2013.01)

(58) Field of Classification Search
CPC .... G02B 6/4206; G02B 5/008; G02B 6/1226; G02B 6/14; G02B 6/264; G02B 6/4218
USPC ..................... 385/50, 129–132, 28
See application file for complete search history.

(56) References Cited

U.S. PATENT DOCUMENTS

| | | | |
|---|---|---|---|
| 5,237,629 A | 8/1993 | Hietala et al. | |
| 5,270,532 A | 12/1993 | Hietala et al. | |
| 5,315,430 A | 5/1994 | Brennan et al. | |
| 5,333,000 A | 7/1994 | Hietala et al. | |
| 5,358,928 A | 10/1994 | Ginley et al. | |
| 5,463,649 A | 10/1995 | Ashby et al. | |
| 5,627,929 A | 5/1997 | Vawter et al. | |
| 5,745,630 A | 4/1998 | Vawter et al. | |
| 5,998,781 A | 12/1999 | Vawter et al. | |
| 6,229,947 B1 | 5/2001 | Vawter et al. | |
| 6,365,428 B1 | 4/2002 | Zubrzycki et al. | |
| 6,504,859 B1 | 1/2003 | Zutavern et al. | |
| 6,605,339 B1 | 8/2003 | Marshall et al. | |

(Continued)

OTHER PUBLICATIONS

Lu et al, "Efficient 3D Nanofocusing Based on Surface Plasmon Polaritons", 2008 OSA.*
U.S. Appl. No. 14/801,257, filed Jul. 16, 2015, Skogen.
Berini P et al., "Integrated optics based on long-range surface plasmon polaritons," Chapter 15 in "Surface Plasmon Nanophotonics," (eds. ML Brongersma and PG Kik), 2007, Springer, Dordrecht, the Netherlands, pp. 217-233.
Briggs RM et al., "Efficient coupling between dielectric-loaded plasmonic and silicon photonic waveguides," *Nano Lett.* 2010;10:4851-7.

(Continued)

*Primary Examiner* — Ellen Kim
(74) *Attorney, Agent, or Firm* — Helen S. Baca; Martin I. Finston

(57) ABSTRACT

The present invention relates to optical vias to optically connect multilevel optical circuits. In one example, the optical via includes a surface plasmon polariton waveguide, and a first optical waveguide formed on a first substrate is coupled to a second optical waveguide formed on a second substrate by the surface plasmon polariton waveguide. In some embodiments, the first optical waveguide includes a transition region configured to convert light from an optical mode to a surface plasmon polariton mode or from a surface plasmon polariton mode to an optical mode.

15 Claims, 9 Drawing Sheets

(56) References Cited

U.S. PATENT DOCUMENTS

| | | | |
|---|---|---|---|
| 6,673,254 B1 | 1/2004 | Marshall et al. | |
| 6,774,532 B1 | 8/2004 | Marshall et al. | |
| 7,106,448 B1 | 9/2006 | Vawter et al. | |
| 7,187,815 B1 | 3/2007 | Sweatt et al. | |
| 7,336,855 B1 | 2/2008 | Vawter | |
| 7,469,083 B2 * | 12/2008 | Todori | B82Y 20/00 385/14 |
| 7,564,387 B1 | 7/2009 | Vawter et al. | |
| 7,787,719 B1 | 8/2010 | Vawter | |
| 7,995,877 B1 | 8/2011 | Skogen et al. | |
| 8,014,639 B1 | 9/2011 | Skogen et al. | |
| 8,346,039 B2 * | 1/2013 | Lu | G02B 6/1226 385/129 |
| 8,363,990 B1 | 1/2013 | Skogen | |
| 8,582,931 B1 | 11/2013 | Vawter | |
| 8,687,665 B1 | 4/2014 | Tauke-Pedretti et al. | |
| 8,725,004 B1 | 5/2014 | Vawter | |
| 8,730,562 B1 | 5/2014 | Tauke-Pedretti et al. | |
| 8,946,052 B2 | 2/2015 | Nielson et al. | |
| 9,029,239 B2 | 5/2015 | Tauke-Pedretti et al. | |
| 9,052,450 B2 * | 6/2015 | Choo | B82Y 20/00 |
| 2005/0249451 A1 * | 11/2005 | Baehr-Jones | G02B 6/1226 385/14 |
| 2010/0111475 A1 * | 5/2010 | Lu | G02B 6/1226 385/50 |
| 2010/0316325 A1 * | 12/2010 | Okamoto | B82Y 20/00 385/3 |
| 2011/0170822 A1 * | 7/2011 | Avrutsky | B82Y 20/00 385/11 |
| 2012/0243821 A1 * | 9/2012 | Belkin | B82Y 20/00 385/11 |
| 2013/0051748 A1 * | 2/2013 | Charbon | B82Y 20/00 385/131 |
| 2014/0102520 A1 | 4/2014 | Tauke-Pedretti et al. | |
| 2015/0114444 A1 | 4/2015 | Lentine et al. | |
| 2015/0221627 A1 | 8/2015 | Nielson et al. | |

OTHER PUBLICATIONS

Choo H et al., "Nanofocusing in a metal-insulator-metal gap plasmon waveguide with a three-dimensional linear taper," *Nature Photon.* Dec. 2012;6:838-44.

Kish FA et al., "Current status of large-scale InP photonic integrated circuits," *IEEE J. Sel. Topics Quantum Electron.* Nov./Dec. 2011;17(6):1470-89.

Luo Y et al., "Compact on-chip plasmonic light concentration based on a hybrid photonic-plasmonic structure," *Optics Exp.* Jan. 2013:21(2):1898-9.

Ma H et al., "Polymer-based optical waveguides; Materials, processing, and devices,"*Adv. Mater.* Oct. 2002;14(19):1339-65.

Raburn M et al., "3-D photonic circuit technology," *IEEE J. Sel. Topics Quantum Electron.* Jul./Aug. 2002;8(4):935-42.

Skogen EJ et al., "A quantum-well-intermixing process for wavelength-agile photonic integrated circuits," *IEEE J. Sel. Topics Quantum Electron.* Jul./Aug. 2002;8(4):863-9.

Skogen EJ et al., "Optical AND and NOT gates at 40 Gbps using electro-absorption modulator/photodiode pairs," *Proc. 23rd Annual Meeting of the IEEE Photonics Soc.*, held on Nov. 7-11, 2010 in Denver, Colorado, pp. 52-53.

Skogen EJ et al., "Optical logic gates using interconnected photodiodes and electro-absorption modulators,"*Photonics in Switching Conf.*, held on Jul. 25-28, 2010 in Monterey, California (3 pp.).

Tauke-Pedretti A et al., "Cascaded double ring resonator filter with integrated SOAs," *Optical Fiber Commun. Conf. and Expo. (OFC/NFOEC) and the Nat'l Fiber Optic Engineers Conf.*, held on Mar. 6-10, 2011 in Los Angeles, California (3 pp.).

Xia F et al., "Photonic integration using asymmetric twin-waveguide (ATG) technology: Part I—concepts and theory," *IEEE J. Sel. Topics Quantum Electron.* Jan./Feb. 2005;11(1):17-29.

* cited by examiner

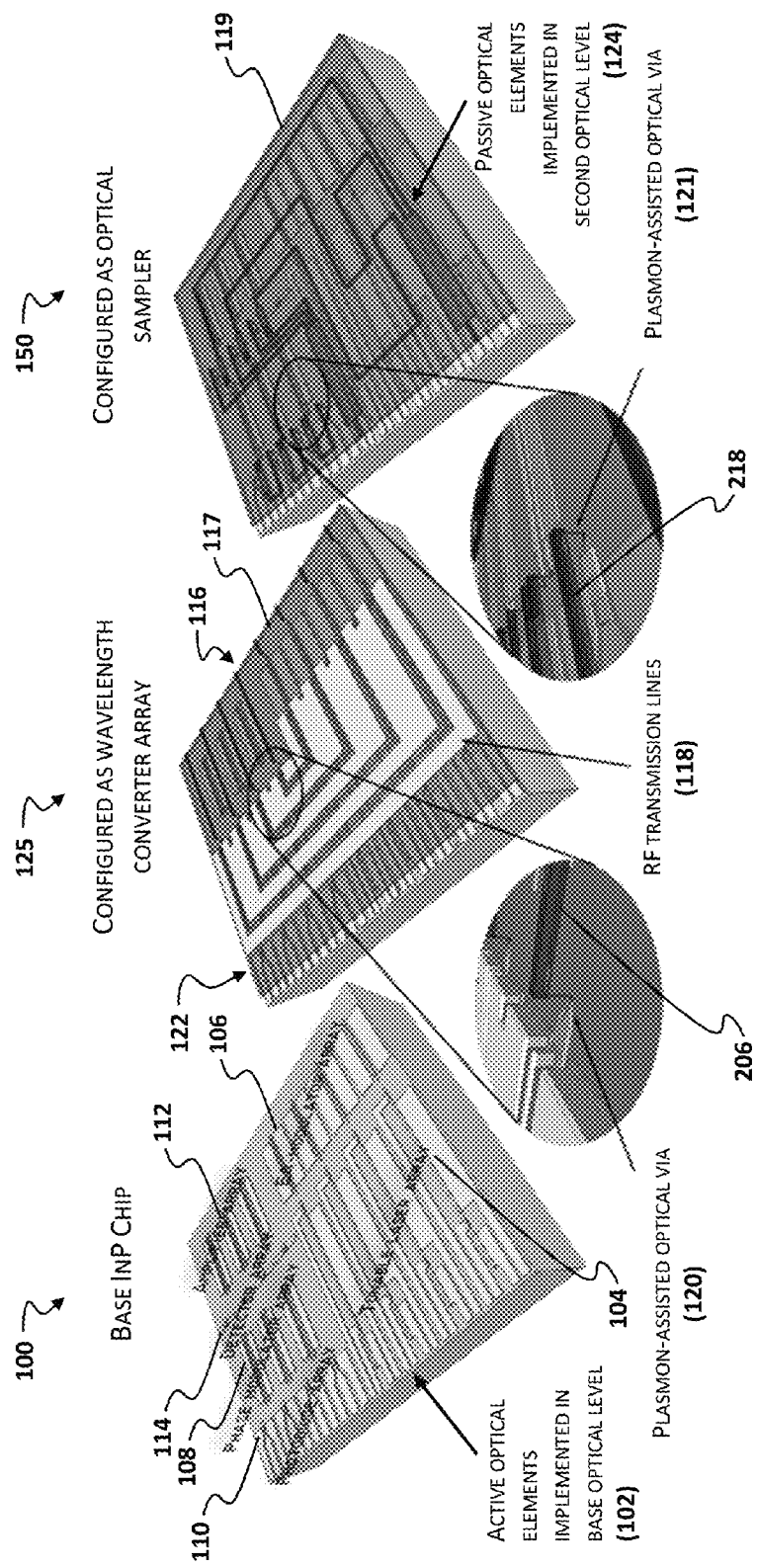

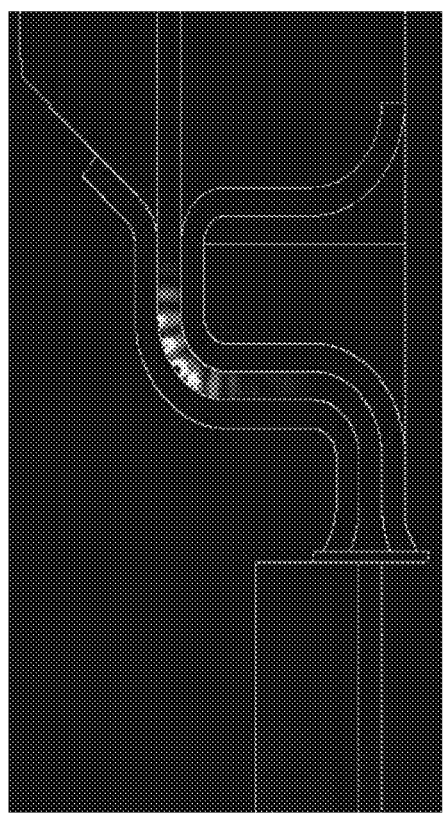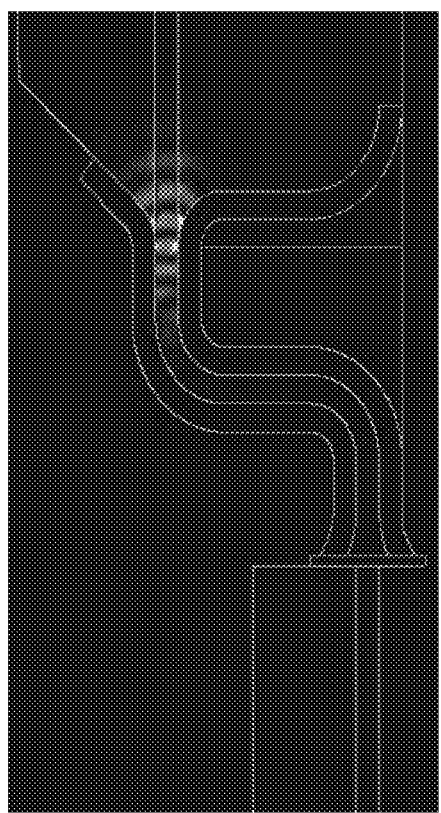

PLASMON-ASSISTED OPTICAL VIAS FOR PHOTONIC ASICS

CROSS-REFERENCE TO RELATED APPLICATION

This application claims the benefit of U.S. Provisional Application No. 62/049,033, filed Sep. 11, 2014, which is hereby incorporated by reference in its entirety.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

TECHNICAL FIELD

This invention relates to plasmon-assisted optical vias for photonic application-specific integrated circuits (ASICS).

BACKGROUND

Photonic integrated circuits (PICs) are a type of optoelectronic integrated circuit and can include a plurality of optoelectronic devices that are optically interconnected using a plurality of physical structures for guiding electromagnetic waves in the optical spectrum, also referred to as optical waveguides. Over the past decade, there have been attempts to integrate optics with electronics on the microscopic scale. Many areas of technology, particularly communications related technology, stand to benefit from such integration. While electrical pulses navigate the tight turns and bends of electronic circuits, optical pulses are unable to navigate these tight turns without unacceptable loss. As such, the achievable complexity for PICs is not nearly as high as for electronic integrated circuits. Thus, while the feature sizes for electronic circuits continue to shrink, conventional PIC sizing has plateaued.

SUMMARY

This disclosure describes, among others, devices and techniques for constructing a multilayer optical circuit using plasmonic waveguide and optical vias for connecting optical waveguide circuit layers. Forming such a multilayer optical circuit presents a unique value opportunity for high-channel density communication as well as for processing, monitoring, manipulating, and/or (de)encrypting vast amounts of data at line rate. Such circuits can also improve PIC fabrication and prototyping, lower costs, and enable more complex functionality of the PICs. For example, this approach can enable programming the PICs using optical interconnects that reside on a second level on the base chip. In other words, this arrangement of optoelectronic components can be optically 'wired' together in different configurations, thus enabling a plurality of circuit functionality using the same base chip. This versatility can support high-confidence rapid prototyping and multi-user wafer runs resulting in a lower cost barrier to PICs.

In one aspect, the device includes a first optical waveguide formed on a first substrate; and a second optical waveguide formed on a second substrate and coupled to the first optical waveguide by a surface plasmon polariton (SPP) waveguide, where the first optical waveguide includes a transition region configured to convert light from an optical mode to a SPP mode or from a SPP mode to an optical mode.

In another aspect, the device includes a compact multi-level optical circuit comprising a first substrate including one or more optical waveguides and one or more active optical elements; a second substrate including one or more optical waveguides; and one or more couplers between at least one of the one or more optical waveguides in the first substrate and at least one of the one or more optical waveguides in the second substrate. In some embodiments, the one or more couplers include a transition region configured to convert a light from an optical mode to a SPP mode and a transition region configured to convert a light from a SPP mode to an optical mode. In other embodiments, one or more couplers optically connect at least one of the one or more optical waveguides in the first substrate with at least one of the one or more optical waveguides in the second substrate. Exemplary couplers include a photon-to-plasmon coupler, a plasmon-to-photon coupler, or a photon-to-plasmon-to-photon coupler.

In a further aspect, the method includes coupling a first optical waveguide in a first substrate and a second optical waveguide in a second substrate with a SPP waveguide; propagating a light wave in an optical mode along the first optical waveguide; converting the optical mode to a plasmon mode; propagating the plasmon mode along the SPP waveguide; converting the plasmon mode to an optical mode; and propagating the optical mode along the second optical waveguide. Additional plasmon modes, SPP waveguides, and optical waveguides may be employed in this method.

For any embodiment herein, the aspect can include corresponding computer systems, apparatus, and computer programs recorded on one or more computer storage devices, each configured to perform any recited actions (e.g., a configured action of the component or an action recited in any method herein).

Embodiments of the disclosed methods, systems, and devices may include one or more of the following features. In one embodiment, the first substrate is arranged over the second substrate. In one embodiment, the second substrate is arranged over the first substrate. In another embodiment, a dielectric substrate separates the first substrate from the second substrate. In yet another embodiment, a dielectric portion is located on or within the second layer. In some embodiments, the first and second substrates (or layers) are generally planar. In other embodiments, the generally planar substrates (or layers) are vertically stacked, and one or more SPP waveguides are vertically disposed within the stack.

In some embodiments, the SPP waveguide extends through a dielectric substrate and/or the second layer. In other embodiments, the SPP waveguide is configured to propagate the SPP mode vertically (e.g., between two or more layers or substrates).

In some embodiments, the first optical waveguide is a semiconductor waveguide. In other embodiments, the second optical waveguide is a polymer waveguide.

In some embodiments, the coupling loss is less than about 10 percent, and the propagation loss is less that about 1 dB in polarization contrast.

In some embodiments, the optically connected optical waveguides in the first substrate and the second substrate are configured to guide an input of continuous light to one or more of the active optical elements.

As used herein, the term surface plasmon (SP) is also used for a surface plasmon polariton (SPP).

The term "about" is meant +/−10% of the recited value.

The term "optical via" includes at least one interconnect between one or more adjacent layers of a multilayer device, e.g., a photonic integrated circuit, such that the at least one interconnect forms an optical connection or conduit between the one or more adjacent layers.

The term "optical element" (also denoted a photonic element) means any element formed in order to produce an effect upon an optical signal or signals.

The term "optical" illumination refers to any illumination with electromagnetic radiation (e.g., ultraviolet, visible, near-infrared, etc.); it is not limited to illumination with visible electromagnetic radiation.

DESCRIPTION OF DRAWINGS

FIG. 1A-1C provides various configurations for an optical device. Provided are (A) a schematic perspective view of a base chip 100 including a first layer of active optical elements 102; (B) a schematic perspective view of a wavelength converter array 125 including a plasmon-assisted optical via connecting the active optical elements on the base chip of FIG. 1A and a second optical and/or electrical layer; and (C) a schematic perspective view of an optical sampler 150 including a plasmon-assisted optical via connecting the active optical elements on the base chip of FIG. 1A and a second optical and/or electrical layer.

FIG. 6A-6G are simulation images of an exemplary plasmon-assisted optical via having the structure in FIG. 5. Insertion loss was about 4 dB.

Figure 2B:
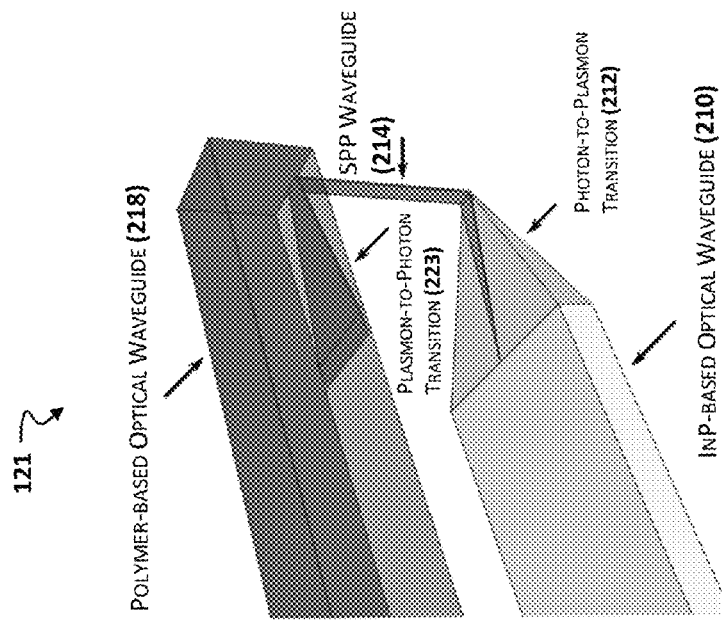
FIG. 2A-2B provides schematic perspective views of two types of a plasmon-assisted optical via or coupler 120, 121.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description below. Other features and advantages of the invention will be apparent from the following detailed description, and from the claims.

DETAILED DESCRIPTION

In a conventional PIC, the planar nature and inherent limitations of the optical interconnects between vertical layers prevents a compact and complex PIC arrangement. In contrast, integrated circuits have thrived, at least in part, due to vertically stacked electrical interconnects that enable compact and complex circuits. In general, this disclosure discusses examples of PICs including at least one connection between one or more vertically disposed layers.

Referring to FIG. 1A, the photonic integrated circuit includes a semiconductor substrate 100 including a plurality of active optical elements 102 formed thereon including, e.g., a tunable laser array 104, an electro-absorption modulator array 106, a phase modulator array 108, a high-speed photodiode array 110, an optical amplifier array 112, a waveguide photodetector array 114, or any combination thereof. The semiconductor substrate 100 can include an indium phosphide (InP) substrate. One or more of the active optical elements 102 can be formed from one or more semiconductor layers and integrated with the semiconductor substrate 100. For example, one or more active optical elements 102 can be epitaxially grown on the InP substrate. A plurality of passive optical waveguides can also be provided on the substrate and formed from the plurality of compound semiconductor layers (e.g., III-V layers).

The active optical elements 102 integrated on the semiconductor substrate 100 can be connected optically to one or more optical waveguides (e.g., semiconductor-based optical waveguides), thereby forming an optical waveguide layer. Accordingly, the first layer or substrate can include one or more active optical elements, one or more optical waveguides (e.g., optically connected to one or more active optical elements, such as, e.g., by use of an optical waveguide 202 in FIG. 2A), and/or one or more couplers (e.g., located in proximity to an end of one or more optical waveguides). Exemplary couplers are described herein.

In some cases, the semiconductor substrate 100 can include one or more semiconductor layers including a material selected from InP, indium gallium arsenide phosphide (InGaAsP), indium gallium arsenide (InGaAs), indium aluminum gallium arsenide (InAlGaAs), gallium arsenide (GaAs), aluminum gallium arsenide (AlGaAs), and combinations thereof, including doped forms thereof (e.g., including one or more n-type or p-type dopants).

The tunable laser array 104 can be formed on the semiconductor substrate 100 and can be configured to generate light, e.g., a pulse, beam, or continuous light, at a large number of possible output wavelengths. The light can have a wavelength in the range of 0.8-2.0 microns (μm). While the tunable laser array 104 is generally shown on the semiconductor substrate 100, the tunable laser array 104 can be formed separately from the semiconductor substrate 100 and optically coupled, e.g., by an optical fiber or by a space coupler, to the substrate.

The amplifier array 112 can be formed on the semiconductor substrate 100 and include one or more optical amplifiers to amplify one or more optical input signals (e.g., signals generated by the tunable laser array 104 or modulated or propagated by any other optical element). For example, such amplification can provide signal gain to compensate for the input and output optical coupling losses as well as the optical-to-electrical and electrical-to-optical conversion efficiencies. This is useful to provide an increased optical power (e.g., up to a few tens of milliWatts) for the amplified optical inputs to, for example, provide larger photocurrent signals from a photodetector array 114. In other cases, the amplifier array 112 additionally or alternatively amplifies one or more digital optical inputs or outputs.

The photodetector array 114 includes one or more photodetectors to detect the incoming light wave having a first wavelength and to produce an electrical signal. In some embodiments, the electrical signal, in turn, modulates the outgoing light wave having a second desired wavelength.

The electro-absorption modulator array 106 can include a plurality of electro-absorption modulators, e.g., traveling-wave electro-absorption modulators, formed on the semiconductor substrate 100 to receive optical input, for example, an optical input sampling signal and/or an optical analog input signal. The electro-absorption modulator array 106 operates based on the electroabsorption effect, which is defined as the change of material absorption in the presence of an electric field. In some cases, the electro-absorption modulator array 106 can include a waveguide with electrodes for applying an electric field in a direction perpendicular to the modulated light beam.

The high-speed photodiode array 110 is formed, e.g., monolithically integrated, on the semiconductor substrate 100 and includes one or more photodiodes for converting the one or more optical input signals to one or more electrical output signals. One or more photodiodes within the photodiode array 110 can be configured to receive an optical analog input signal (or an optical sample of this optical analog input signal) and convert the optical analog input signal to one or more electrical input signals (or electrical sample(s) of the optical sample). In some embodiments, the electrical input signal can be used to modulate an optical input signal (e.g., a delayed optical input signal, such as from an optical sampler), thereby producing a modulated optical input signal. In other embodiments, the electrical input signal or modulated form thereof can be digitized, e.g., by relaying the electrical input signal or modified signal to an analog-to-digital converter (ADC) to provide one or more digital signals.

The photodiode can be employed in any useful manner. In one embodiment, an optical modulator includes one or more photodiodes to provide an electrical output signal, which in turn can be used to modulate an optical signal. In some embodiments, an optical analog input signal is split into a plurality of parallel optical input signals (e.g., by configuring an optical analog input signal source to be connected optically to an optical splitter), and each parallel optical input signal is sampled with an optical sampling signal (e.g., a delayed optical sampling signal) to provide a plurality of successive optical samples of the optical analog input signal. Each optical sample can, in turn, be digitized to provide an analog electrical signal or a pair of analog electrical signals.

Optical samples can be produced in any useful manner. For instance, optical samples can be formed by modulating each parallel optical input signal with an optical sampling signal as an input. In one embodiment, the optical modulator is configured to receive an optical sampling signal as an optical input signal and to receive a converted parallel optical input signal as an electrical input signal (e.g., where the converted parallel optical input signal is an electrical signal that is obtained by employing a parallel optical input signal as an optical input signal for a photodiode). In another embodiment, the optical modulator is configured to receive a parallel optical input signal as an optical input signal and to receive a converted optical sampling signal as an electrical input signal (e.g., where the converted optical sampling signal is an electrical signal that is obtained by employing a optical sampling signal as an optical input signal for a photodiode).

The phase modulator array 108 can be formed on the semiconductor substrate 100 and include one or more modulators to control and/or detect the phase of the received signals. In some cases, the phase modulator array 108 can include a plurality of phase modulators formed on the semiconductor substrate to control the phase of received signals.

These active optical elements of the base substrate (or first layer) can be connected in any useful manner. In particular embodiments, such connections are formed by connecting vertically configured optical vias and horizontally configured optical waveguides. In one embodiment, the optical via includes a SPP waveguide. In another embodiment, the optical via includes a SPP waveguide (e.g., including a conductive metal and a dielectric, such as any herein), a photon-to-plasmon coupler (e.g., a photon-to-plasmon transition region disposed in proximity to a first optical waveguide and connected to the SPP waveguide), and a plasmon-to-photon coupler (e.g., a plasmon-to-photon transition region disposed in proximity to a second optical waveguide and connected to the SPP waveguide). In yet another embodiment, the SPP waveguide is generally configured to be located vertically between two or more layers, and the photon-to-plasmon and plasmon-to-photon couplers are generally configured to be parallel to the optical waveguide to which it is connected.

FIGS. 1B and 1C illustrates exemplary multilayer PICs including one or more optical and/or electrical levels vertically separated from yet vertically coupled to the active optical elements on the semiconductor substrate 100. Here, the multilayer PICs, configured either as a wavelength converter array 125 or as an optical sampler 150, include at least two vertically separated layers. The base level includes one or more active optical elements 102 and one or more optical waveguides. The second level can include passive optical elements, e.g., optical waveguides. The base level and the second level are separated by a dielectric interlayer. However, a SPP waveguide can couple the optical waveguides of the first layer and the optical waveguides of the second layer.

Of course, the device can include more than two layers, e.g., n layers, where n is an integer of 2 or more. In some embodiments, the device includes n layers that are vertically stacked, and one or more optical vias are disposed between each $n^{th}$ and $n-1^{th}$ layers. Each layer can be formed from any useful material, such as any semiconductor or polymer materials herein.

Figure 2A:
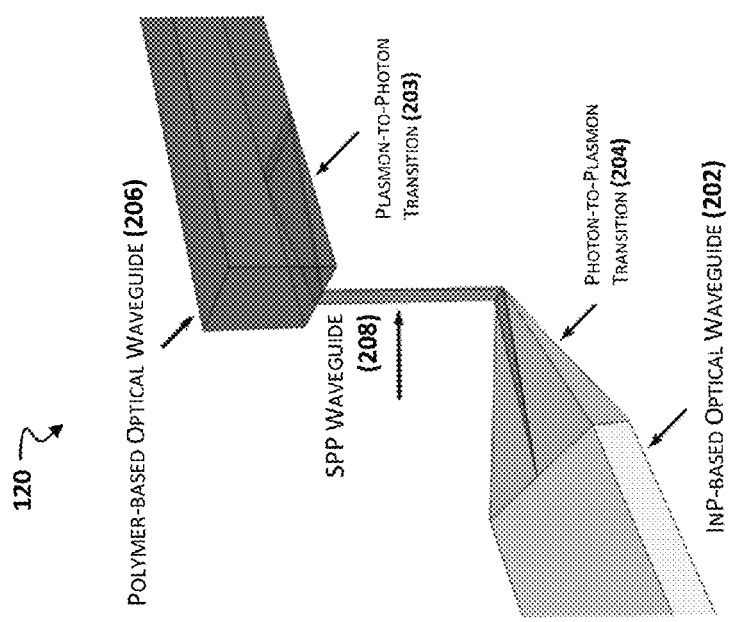

FIGS. 2A and 2B illustrates exemplary vertical connections using an optical via including coupler(s) to connect the base layer, e.g., the active optical elements, to one or more other layers. In some cases, the coupler is a plasmon-to-photon coupler. In other cases, the coupler is a photon-to-plasmon coupler. What is more, the coupler(s) can effectively connect both semiconductor-based waveguides and polymer-based waveguides.

Referring to FIG. 2A, the optical waveguide 202 can be an effective guide for planar photon propagation, e.g., within the x-y plane or in a horizontal manner, but can experience photon scattering at vertical waveguide junctures. Meanwhile the SPP waveguide 208 is well suited to abrupt splits and bends but does not effectively propagate beyond short distances, e.g., less than 100 microns, 90 microns, 80 microns, 70 microns, 60 microns, 50 microns, 40 microns, 30 microns, or 10 microns. Here, the coupler 120 advantageously combines the optical waveguide 202 and surface polariton waveguide 208 to achieve planar and vertical photon propagation.

The first photon-to-plasmon-to-photon coupler 120 (or via) includes an optical waveguide 202 transitioning to a photon-to-plasmon transition region 204 before connecting to a polymer-based optical waveguide 206 through a SPP waveguide 208. For planar propagation, the optical waveguide is used along each layer, while the SPP waveguide 208 is used for vertical photon propagation between the vertical layers.

The optical waveguide 202 in, for example, the substrate layer 100 is connected to the photon-to-plasmon transition region 204. The photon-to-plasmon transition region 204 can have a tapered or triangular shape. The photon-to-plasmon transition region 204 can also include a material compatible with plasmonic excitation, for example, a metal film formed on a dielectric. The metal film can be selected from silver, platinum, gold, or alloys thereof. The photon-to-plasmon transition region 204 concentrates and creates a phase shift from optical signals guided by the optical waveguides to an electromagnetic wave that can propagate vertically along the SPP waveguide 208, e.g., a transverse electromagnetic mode (e.g., a long range symmetric $ss_b^0$ mode, such as described in Berini P, "Integrated optics based on long-range surface plasmon polaritons," Chapter 15 in "Surface Plasmon Nanophotonics," (eds. M L Brongersma and P G Kik), 2007, Springer, Dordrecht, the Netherlands, pp. 217-33, which is incorporated herein by reference in its entirety.

The coupler or optical via can have any useful geometry. For instance, the first photon-to-plasmon-to-photon coupler 120 includes a SPP waveguide 208 in which the optical mode continues to travel in the same direction. In contrast, the second photon-to-plasmon coupler 121 includes a SPP waveguide 214 in which the optical mode continues to travel in the one direction and then must travel back in the direction from which it came. As shown in FIG. 2B, the second photon-to-plasmon-to-photon coupler 121 includes an optical waveguide 210 transitioning to a photon-to-plasmon transition region 212 before connecting to a polymer-based optical waveguide 218 through a SPP waveguide 214. For planar propagation, the optical waveguide is used along each layer while the SPP waveguide 214 is used for vertical photon propagation between the vertical layers.

In some instances, the SPP waveguide 208, 214 is connected to a plasmon-to-photon transition region 203, 223 (e.g., which is located on or in proximity to a second optical waveguide). The plasmon-to-photon transition region 203, 223 can have an expanded or trapezoidal shape. The plasmon-to-photon region 203, 223 can also include a material compatible with plasmonic excitation, for example, a metal film formed on a dielectric. The metal film can be selected from silver, platinum, gold, or alloys thereof. The plasmon-to-photon transition region 203, 223 converts the electromagnetic wave back into an optical signal, which is then transmitted to the second optical waveguide 206, 218.

The vertical SPP mode propagation, as described above, enables the photon-to-plasmon-to-photon coupler 120, 121 to have a compact micron-scale size, as well as low coupling and propagation loss. In some cases, the coupler 120, 121 has an insertion loss of less than about 0.5 dB per transition and a footprint of 10 µm×10 µm or smaller. The coupler 120, 121 also can have more than about 40 nm 3-dB spectral bandwidth, less than about 10% coupling into random phase, and less than about 1 dB loss in polarization contrast.

The fabrication techniques for PIC are typically similar to the fabrication techniques used in ICs. In the fabrication process, the PIC devices that can be mounted on a PIC chip include, but are not limited to, the above mentioned passive, active, and electro-optic devices, with applications ranging from the field of fiber-optic communication, computing, sensing, to biomedical.

Referring back to FIGS. 1B and 1C, an arrangement of optoelectronic components can be interconnected to enable different functions, for example, a wavelength converter array 125 or an optical sampler 150. The first base level can include one or more active optical elements 102, such as any herein. The second level can be an electrical or optical level, where this second level is disposed above the first base level. Optical communication between the first and second levels is realized by the use of one or more optical vias of an appropriate geometry (e.g., a geometry in FIG. 2A or 2B). When the second level is an electrical level, then an electrically insulating interlayer (e.g., a dielectric interlayer) may be disposed between the first and second levels. When the second level is an optical level, then an optically insulating interlayer (e.g., a dielectric interlayer, such as $SiO_2$) may be disposed between the first and second levels.

In one instance, the optical multilayer circuit can be configured as a wavelength converter array. For example, FIG. 1B shows the semiconductor substrate 100 is connected to a second optical and/or electrical level 116 using one or more plasmon-assisted optical vias 120. A close-up of optical via 120 is provided in FIG. 2A. The second optical and/or electrical level 116 can include various optical and electrical elements, for example, a radiofrequency transmission line 118 and a polymer-based optical waveguide 206 are implemented, and active optical elements, as described above, are optically coupled or 'wired' to enable communication between the two layers. The wavelength converter array 125 can also include the dielectric interlayer 117 to separate the second layer, e.g., the polymer-based optical waveguides 206 from the semiconductor substrate 100. As described above, the first layer and the second layer are connected by the SPP waveguide 208 that traverses vertically through the dielectric interlayer 117 to connect, for example, the two optical waveguides 202, 206.

In another instance, the optical multilayer circuit can be configured as an optical sampler, e.g., a parallel optical sampler optionally connected to an electrical analog-to-digital converter. For example, FIG. 1C shows the semiconductor substrate 100 is connected to a second optical level 119 using one or more plasmon-assisted optical vias 121. A close-up of optical via 121 is provided in FIG. 2B. The second optical level 119 can include optical elements (e.g., passive optical elements 124) disposed in a dielectric layer, for example, optical splitters and a polymer-based optical waveguide 218 are implemented and active optical elements, as described above, are optically coupled or 'wired' to enable communication between the two layers. As described above, the first layer and the second layer are connected by the SPP waveguide 214 that traverses vertically through the dielectric layer to connect, for example, the two optical waveguides 210, 218.

Figure 3:
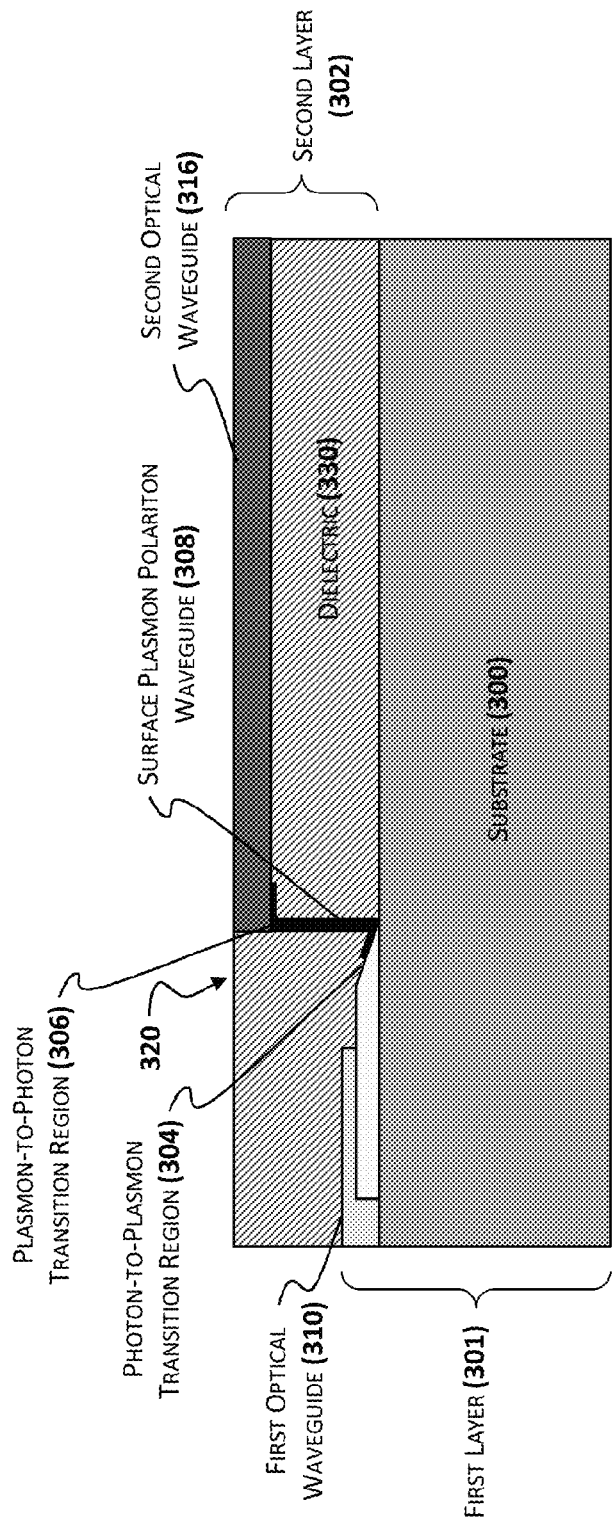
FIG. 3 is a schematic cross-sectional view of one embodiment of the first and second layers 301, 302.

The first and second layers can be connected optically in any useful manner. For instance, as shown in FIG. 3, the first layer 301 and second layer 302 are connected optically by an optical via 320. The first layer 301 includes a first optical waveguide 310 disposed on the substrate 300. A photon-to-plasmon transition region 304 is located at one end of the first optical waveguide 310. The second layer 302 includes a dielectric portion 330 and a second optical waveguide 316. As can be seen, the SPP waveguide 308 is vertically configured. The optical via 320 includes, at least, the SPP waveguide 308. In some embodiments, the via also includes the photon-to-plasmon transition region 304 and the plasmon-to-photon transition region 306 (e.g., as described herein) located in proximity to the second optical waveguide 316.

Figure 4:
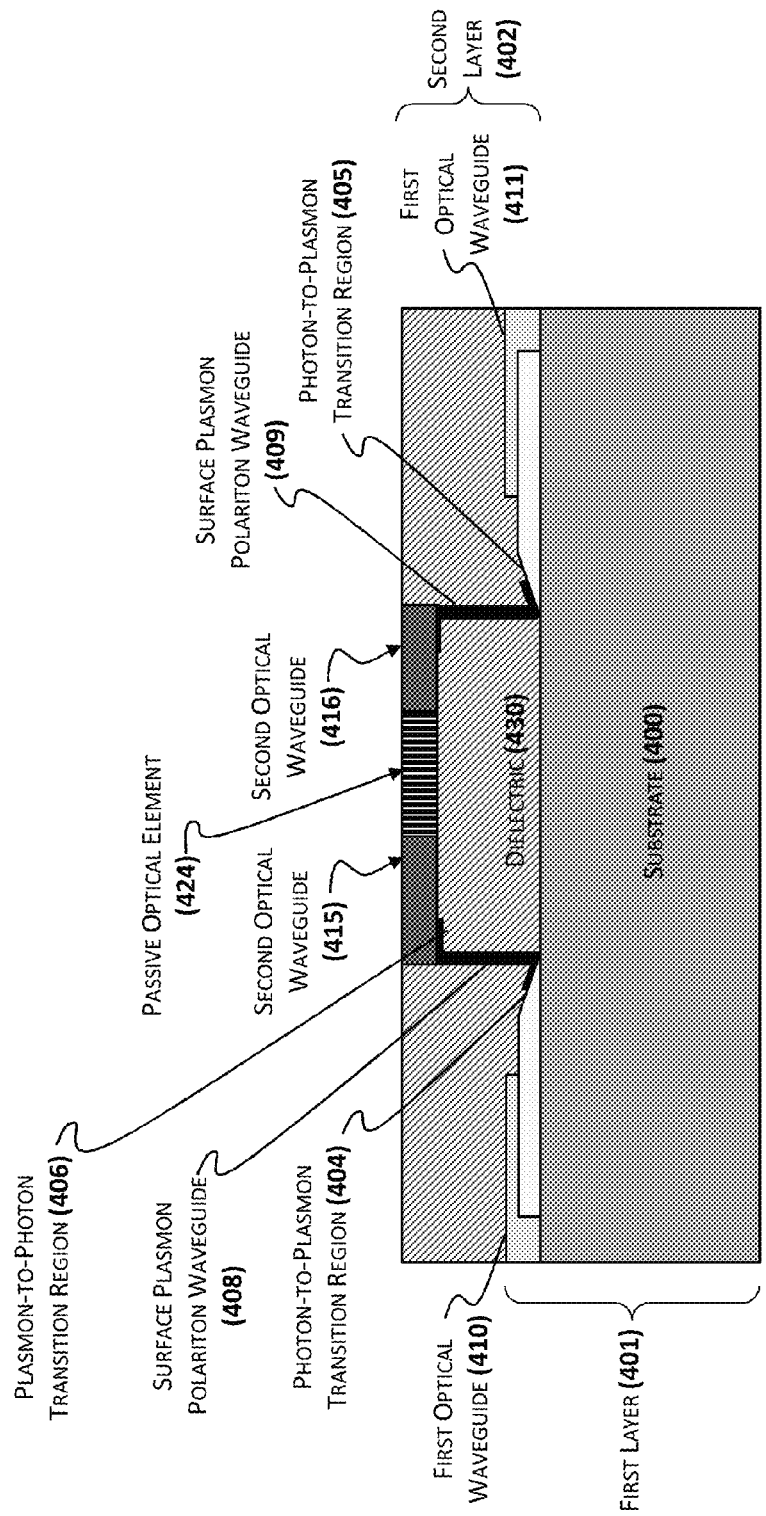
FIG. 4 is a schematic cross-sectional view of another embodiment of the first and second layers 401, 402.

In another instance, numerous vias connect the first and second layers. For instance, as shown in FIG. 4, the first layer 401 includes a first optical waveguides 410, 411 disposed on the substrate 400. Photon-to-plasmon transition regions 404, 405 are located at one end of the first optical waveguides 410, 411. The second layer 402 includes a dielectric portion 430 and second optical waveguides 415, 416. Here, the second layer 402 also includes a passive optical element 424 that is optically connected to the second optical waveguides 415, 416. In some embodiments, the optical via includes an SPP waveguide 408, a photon-to-plasmon transition region 404, and a plasmon-to-photon transition region 406 (e.g., as described herein) located in proximity to the second optical waveguide 415.

In this multilayered circuit of FIG. 4, two SPP waveguides 408, 409 are vertically configured. In this way, an optical signal is transmitted from the first layer to the second layer, the transmitted signal is optically modified by one or more elements in the second layer, and then the transmitted optically modified signal is relayed back to the first layer (e.g., to any active element in the first layer). Optionally, the transmitted optically modified signal is maintained in the second layer and relayed to another optical element in the second layer. A skilled artisan would understand that other optical connections, as well as other configurations of optical vias and other optical elements, can be formed between different components in separated layers and/or between different components in the same layer, to effect the desired optical circuit or photonic application-specific integrated circuit.

Figure 5:
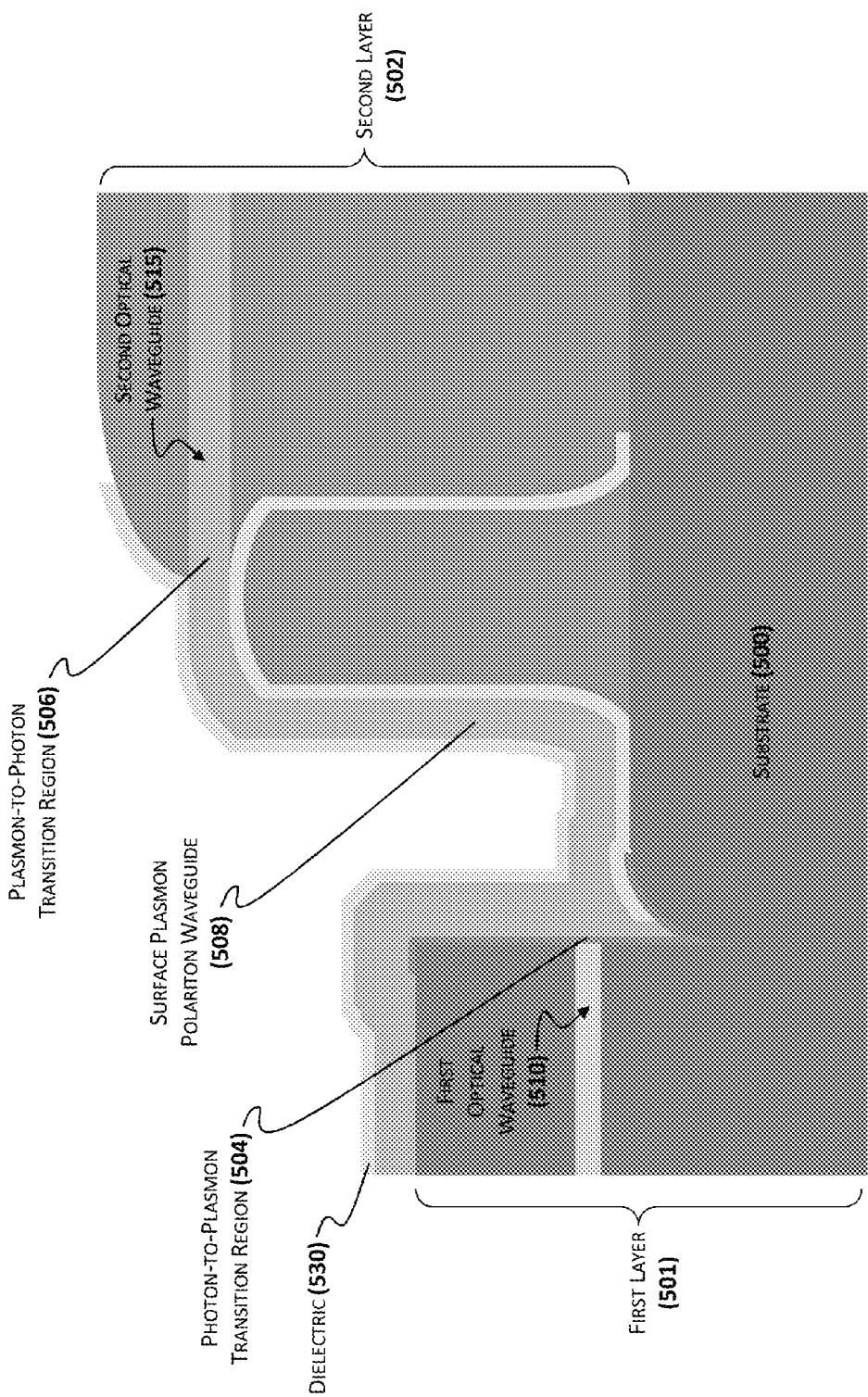
FIG. 5 is a schematic cross-sectional view of yet another embodiment of the first and second layers 501, 502.

FIG. 5 shows yet another embodiment of a multilayered circuit. As seen, the first layer 501 includes a first optical waveguide 510 disposed on the substrate 500. A photon-to-plasmon transition region 504 is located at one end of the first optical waveguide 510. A second layer 502 includes a second optical waveguide 515. A dielectric portion 530 extends between the first and second optical waveguides 510,515 and the SPP waveguide 508. In some embodiments, the optical via includes an SPP waveguide 508, a photon-to-plasmon transition region 504, and a plasmon-to-photon transition region 506 (e.g., as described herein) located in proximity to the first and the second optical waveguides 510,515.

Figure 6A:
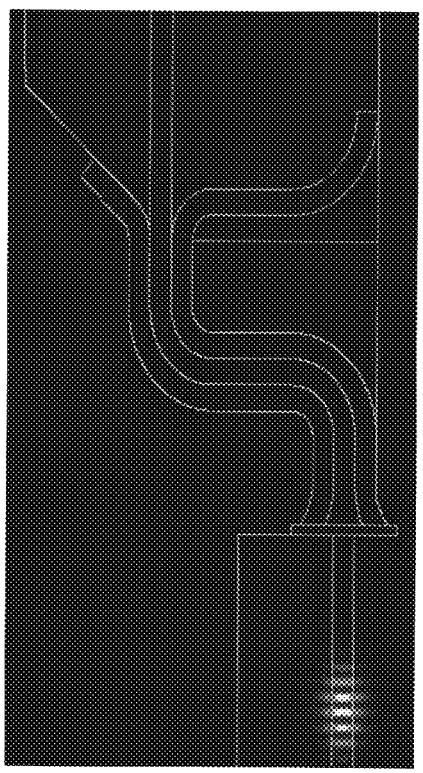
Figure 6B:
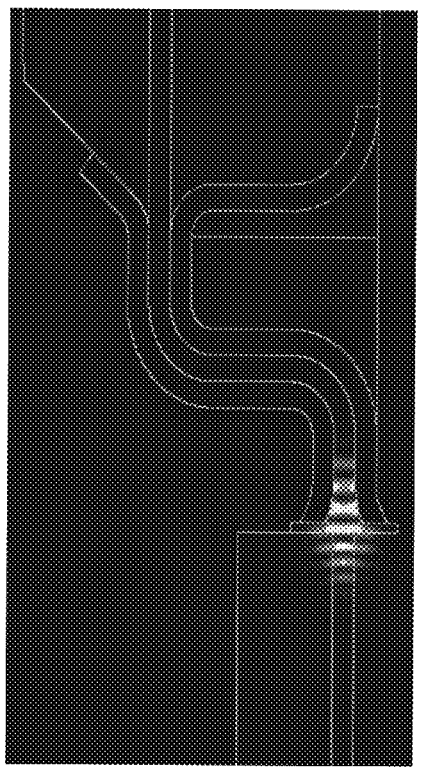
Figure 6C:
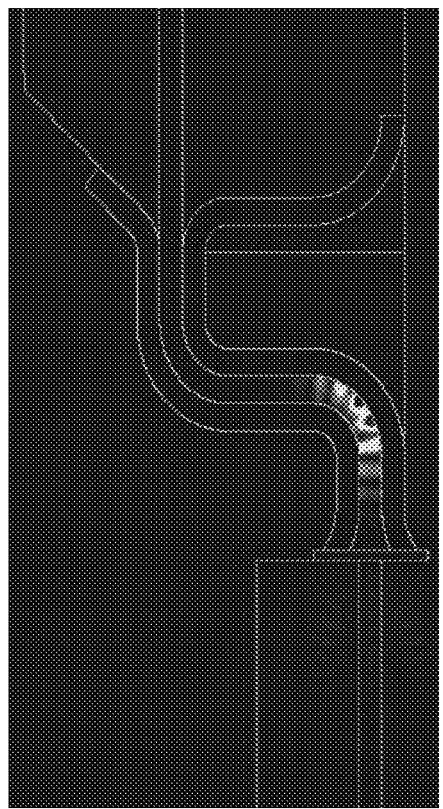
Figure 6D:
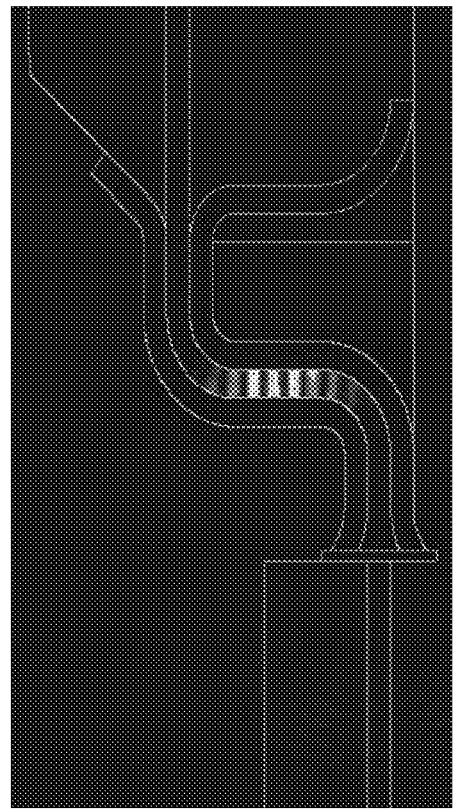
Figure 6G:
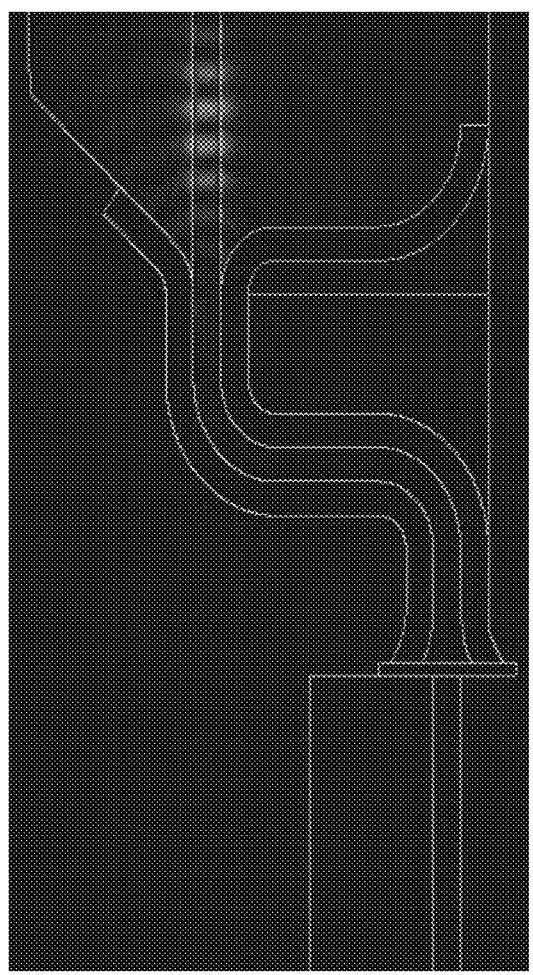

Simulations can be conducted to understand coupling at the nanoscale by employing the plasmon-assisted optical vias described herein. For instance, FIG. 6A-6G shows snapshots from a simulation conducted using the structure provided in FIG. 5. As can be seen, the initial optical signal travels through the first optical waveguide (FIG. 6A), approaches the photon-to-plasmon transition region (FIG. 6B), travels through the SPP waveguide (FIG. 6C-6E), approaches the plasmon-to-photon transition region (FIG. 6F), and enters the second optical waveguide (FIG. 6G). Under these conditions, the insertion loss was about 4 dB.

Any useful optical element can be employed. Exemplary optical elements (e.g., active or passive optical elements) include one or more optical splitters, optical combiners, optical delay elements, optical modulators (e.g., a photodiode, an electro-absorption modulator, a Mach-Zehnder modulator, or a photodiode interconnected Mach-Zehnder modulator), waveguides, amplifiers (e.g., semiconductor optical amplifiers (SOAs)), mirrors, reflectors, optical filters, lasers (e.g., tunable lasers), multimode interference couplers, optical oscillators, optical gratings, multiplexers, demultiplexers, optical switches, as well as any optical element and parallel optical sampler circuit component described in U.S. Pat. Nos. 5,270,532; 5,333,000; 5,463,649; 5,627,929; 5,745,630; 6,229,947; 6,365,428; 7,106,448; 7,187,815; 7,336,855; 7,564,387; 7,787,719; 7,995,877; 8,014,639; 8,363,990; 8,582,931; 8,687,665; 8,725,004; and 8,730,562, as well as Briggs R M et al., "Efficient coupling between dielectric-loaded plasmonic and silicon photonic waveguides." *Nano Lett.* 2010; 10:4851-7; Choo H et al., "Nanofocusing in a metal-insulator-metal gap plasmon waveguide with a three-dimensional linear taper," *Nature Photon.* 2012 December; 6:838-44; Kish F A et al., "Current status of large-scale InP photonic integrated circuits," *IEEE J. Sel. Topics Quantum Electron.* 2011 November/December; 17(6): 1470-89; Luo Y et al., "Compact on-chip plasmonic light concentration based on a hybrid photonic-plasmonic structure," *Optics Exp.* 2013 January; 21(2):1898-910; Raburn M et al., "3-D photonic circuit technology," *IEEE J. Sel. Topics Quantum Electron.* 2002 July/August; 8(4):935-42; Skogen E J et al., "Optical AND and NOT gates at 40 Gbps using electro-absorption modulator/photodiode pairs," *Proc. 23$^{rd}$ Annual Meeting of the IEEE Photonics Soc.*, held on 7-11 Nov. 2010 in Denver, Colo., pp. 52-3; Skogen E J et al., "Optical logic gates using interconnected photodiodes and electro-absorption modulators," *Photonics in Switching Conf.*, held on 25-28 Jul. 2010 in Monterey, Calif. (3 pp.); Tauke-Pedretti A et al., "Cascaded double ring resonator filter with integrated SOAs," *Optical Fiber Commun. Conf. and Expo. (OFC/NFOEC) and the Nat'l Fiber Optic Engineers Conf.*, held on 6-10 Mar. 2011 in Los Angeles, Calif. (3 pp.); and Xia F et al., "Photonic integration using asymmetric twin-waveguide (ATG) technology: Part I-concepts and theory," *IEEE J. Sel. Topics Quantum Electron.* 2005 January/February; 11(1): 17-29, each of which is incorporated herein by reference in its entirety.

The substrate, optical elements, and SPP waveguides can be formed from any useful material by employing any useful process. Exemplary materials include a dielectric (e.g., $SiO_2$, $Si_3N_4$, SiN, SiON, or a polymer), a conductive metal (e.g., Cu, Ag, Al, W, Ti, Pt, Au, Ge, Ni, as well as alloys or combinations thereof), a polymer (e.g., poly(methyl methacrylate) (PMMA), polystyrene (PS), polycarbonate (PC), polyurethane (PU), epoxy resin, bis-benzocyclobutene (BCB), polyacrylates, fluorinated polyimides, perfluorocyclobutyl aryl ethers, perfluorovinyl ether cyclopolymer, tetrafluoroethylene and perfluorovinyl ether copolymers, silicone, fluorinated poly(arylene ether sulfide), and other fluorinated or perfluorinated polymers), an n-type material (e.g., those having n-type dopants, such as silicon, sulfur, selenium, tellurium, or germanium for III-V materials, including InP:Si), a p-type material (e.g., those having p-type dopants, such as zinc, magnesium, cadmium, silicon, or germanium for III-V materials, including InGaAs), a III-V material (e.g., InP, InGaAs, InGaAsP, InAlGaAs, InGaN, GaN, GaAs, and AlGaAs), a cladding material (e.g., InGaAsP:Si (1.3Q:Si), InGaAsP:Zn, InP, InGaAsP, a 1.3Q material, or a 1.4Q material), etc., as well as graded or layered forms of any of these. Additional materials are described in Ma H et al., "Polymer-based optical waveguides: Materials, processing, and devices," *Adv. Mater.* 2002 October; 14(19):1339-65, which is incorporated herein by reference in its entirety. Exemplary processes include epitaxial growth; chemical vapor diffusion (CVD), such as metal-organic CVD (MOCVD), metal-organic vapor phase epitaxy (MOVPE), and molecular beam epitaxy (MBE); milling (e.g., focused ion beam milling); rapid prototyping; microfabrication (e.g., by casting, injection molding, compression molding, embossing, ablation, thin-film deposition, and/or Computer Numerically Controlled (CNC) micromachining); photolithography; etching techniques (e.g., wet chemical etching, reactive ion etching, inductively coupled plasma deep silicon etching, laser ablation, or air abrasion techniques); and quantum well intermixing (QWI) processes, such as those described in Skogen E J et al., "A quantum-well-intermixing process for wavelength-agile photonic integrated circuits," *IEEE J. Sel. Topics Quantum Electron.* 2002 July/August; 8(4):863-9, which is incorporated herein by reference in its entirety.

Waveguides can have any useful configuration, such as ridge waveguides, coaxial waveguides, rectangular waveguides, slab waveguides, planar waveguides, channel waveguides, etc. In some embodiments, the second layer or substrate includes one or more optical waveguides formed from a polymer. In other embodiments, the first layer or substrate includes one or more optical waveguides formed from a semiconductor material (e.g., a III-V material, such as InP). In yet other embodiments, active optical elements are disposed in the first layer or substrate, and passive optical elements are disposed in the second layer or substrate.

The SPP waveguide can have any useful configuration and composition. In some embodiments, the SPP waveguide includes a metal disposed on a dielectric surface (e.g., such as a metal-on-insulator (MOI) waveguide). In other embodiments, the SPP waveguide includes a dielectric material having a top surface and a lower surface, where each of the top and lower surfaces includes a metal (e.g., such as a metal-insulator-metal (MIM) waveguide). In yet other embodiments, the SPP waveguide includes one or more metal protuberances, bumps, slits, apertures, gratings, or particles configured (e.g., in an array) to propagate a surface plasmon. A number of embodiments of the invention have been described. Nevertheless, it will be understood that various modifications may be made without departing from the spirit and scope of the invention.

What is claimed is:

1. A multilevel optical circuit, comprising:
   a first layer that contains one or more first optical waveguides;
   a second layer that contains one or more second optical waveguides; and
   one or more optical vias, each of the optical vias being configured to optically connect a first optical waveguide to a second optical waveguide, wherein:
   each of the optical vias comprises a surface plasmon polariton (SPP) waveguide; the circuit further comprises a respective photon-to-plasmon transition region that couples each of the optical vias to a first optical waveguide; and
   the circuit further comprises a respective plasmon-to-photon transition region that couples each of the optical vias to a second optical waveguide.

2. The multilevel optical circuit of claim 1, wherein the first and second layers extend laterally in two horizontal dimensions and have respective thicknesses in a vertical dimension, and wherein the one or more optical vias are substantially perpendicular to the first and second layers so that said vias extend substantially in the vertical dimension.

3. The multilevel optical circuit of claim 1, wherein at least part of each photon-to-plasmon transition region is coplanar with its connected first optical waveguide or at least part of each plasmon-to-photon transition region is coplanar with its connected second optical waveguide.

4. The multilevel optical circuit of claim 1, wherein at least part of each photon-to-plasmon transition region is collinear with its connected SPP waveguide.

5. The multilevel optical circuit of claim 1, wherein at least part of each plasmon-to-photon transition region is collinear with its connected SPP waveguide.

6. The multilevel optical circuit of claim 1, wherein each optical via extends through a dielectric layer that separates the first layer from the second layer.

7. The multilevel optical circuit of claim 1, wherein:
   one of the first and second waveguides is a semiconductor waveguide, and
   the other of the first and second waveguides is a polymer waveguide.

8. The multilevel optical circuit of claim 1, wherein each SPP waveguide comprises a metal film on a dielectric layer.

9. The multilevel optical circuit of claim 1, wherein each of the optical vias connects a first optical waveguide to a second optical waveguide with an optical coupling loss less than about 10 percent and an optical propagation loss less than about 1 dB in polarization contrast.

10. The multilevel optical circuit of claim 1, wherein the optical coupling effectuated by each of the optical vias and its respective photon-to-plasmon and plasmon-to-photon transition regions occupies a footprint that is no larger than 10 μm×10 μm.

11. The multilevel optical circuit of claim 1, wherein each of the SPP waveguides is less than 100 μm long.

12. The multilevel optical circuit of claim 1, wherein each of the photon-to-plasmon transition regions has a tapered shape.

13. The multilevel optical circuit of claim 12, wherein the tapered shape is triangular.

14. The multilevel optical circuit of claim 1, wherein each of the plasmon-to-photon transition regions has an expanded shape.

15. The multilevel optical circuit of claim 14, wherein the expanded shape is trapezoidal.

* * * * *